(12) United States Patent
Gardner et al.

(10) Patent No.: US 11,441,962 B2
(45) Date of Patent: Sep. 13, 2022

(54) TRANSDUCER ASSEMBLY WITH HEADER WITH IMPROVED CONFIGURATION INCLUDING SIDE PINS

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 99 days.

(21) Appl. No.: 17/093,971

(22) Filed: Nov. 10, 2020

(65) Prior Publication Data

US 2021/0172818 A1 Jun. 10, 2021

Related U.S. Application Data

(60) Provisional application No. 62/943,391, filed on Dec. 4, 2019.

(51) Int. Cl.
*G01L 19/00* (2006.01)
*G01L 13/02* (2006.01)
*G01L 19/06* (2006.01)

(52) U.S. Cl.
CPC ........ *G01L 13/025* (2013.01); *G01L 19/0038* (2013.01); *G01L 19/0084* (2013.01); *G01L 19/0645* (2013.01)

(58) Field of Classification Search
None
See application file for complete search history.

(56) References Cited

U.S. PATENT DOCUMENTS

| 6,330,829 | B1 * | 12/2001 | Kurtz | G01L 19/0645 |
| | | | | 73/717 |
| 7,275,444 | B1 * | 10/2007 | Kurtz | G01L 19/143 |
| | | | | 73/717 |
| 2009/0314094 | A1 * | 12/2009 | Kurtz | G01L 13/025 |
| | | | | 73/721 |
| 2012/0060619 | A1 * | 3/2012 | Gardner | G01L 19/0007 |
| | | | | 29/407.01 |

* cited by examiner

*Primary Examiner* — Lisa M Caputo
*Assistant Examiner* — Nigel H Plumb
(74) *Attorney, Agent, or Firm* — Troutman Pepper Hamilton Sanders LLP; James E. Schutz; Mark Lehi Jones

(57) ABSTRACT

The invention includes differential pressure transducer assembly systems and methods in which headers are configured with header pins that extend perpendicular with respect to an axis of the assembly and through header sidewalls, enabling a compact configuration, ease of assembly, enhanced reliability and/or redundancy. Channels and ports defined in a housing portion of the assembly are configured to enable the use of substantially straight tubing sections for routing main and/or reference pressures to one or more differential sensing elements mounted on the headers. Two or more headers with associated sensing elements can be stacked to provide redundant differential pressure sensing.

20 Claims, 8 Drawing Sheets

TRANSDUCER ASSEMBLY WITH HEADER WITH IMPROVED CONFIGURATION INCLUDING SIDE PINS

CROSS-REFERENCE TO RELATED APPLICATIONS

This application claims priority to U.S. Provisional Patent Application Ser. No. 62/943,391, filed 4 Dec. 2019 and incorporated herein by reference as if fully set forth.

TECHNICAL FIELD

The disclosed technology relates to a pressure transducer assembly having a header configured with interconnecting pins that extend through sidewalls of the header enabling a compact configuration.

BACKGROUND

Pressure transducer assemblies typically include one or more sensing elements mounted on a header, with the header attached to a housing. In a conventional differential pressure transducer, a main inlet port directs a main pressure from the measurement environment through the housing to a front side of the sensing element, and a reference inlet port directs a reference pressure to the back side of the sensing element so that a difference in the applied pressures can be measured. A separate tube is often utilized to route the reference pressure to the back side of the sensing element. To provide signal output and/or to supply power to the sensing element, electrically conductive header pins are typically installed in respective bores through the back portion of the header and secured with electrically insulating seals.

FIG. 1 illustrates a prior art differential pressure sensor assembly 100 in which header pins 118 are installed in the header 110 for making electrical connections from the sensing element 112 to external equipment (not shown). In this conventional assembly 100, the header pins 118 extend through the header 110 and out a back end of the assembly 100. The assembly 100 includes a main port 102 and a reference port 104 with associated respective passageways 103, 105 that direct respective main and reference pressures to opposite sides of a sensing element 112 for measuring differential pressure.

The conventional differential pressure sensor assembly 100 depicted in FIG. 1 includes a separate tube 108 that is disposed externally to the back side of the header 110 so that the reference pressure can be routed from the inlet reference port 104 to the back side of the sensing element 112. After the header 110 is mounted to the housing 106, for example, one end of the tube 108 is typically coupled and brazed to a cap 113 and in communication with a through-hole in the cap. The cap is then mounted to the back side of the header 110. The other end of the tube 108 is mounted to the housing 106 and secured via a ferrule 111. The installation of the externally routed tube 108 can be difficult and can present several drawbacks. The tube 108, for example, can kink when it is bent to form the U-shape. Additionally, once installed, the tube 108 can be easily damaged and can require additional protective structures. A need exists for an improved transducer assembly configuration.

BRIEF SUMMARY

The disclosed technology includes a pressure transducer assembly having a header configured with interconnecting pins that extend through the header sidewalls and perpendicular to the header axis, which can provide a compact configuration that provides certain advantages over conventional designs. Certain implementations of the disclosed technology can be utilized to simplify the assembly process and/or avoid certain drawbacks (as discussed above in reference to the prior configurations). In some implementations, the improved configuration disclosed herein may enable internal routing of port tubing without requiring bending of the tube.

According to an example implementation of the disclosed technology, a differential transducer assembly is provided that includes a housing characterized by a front side and a back side in axial alignment along an axis extending through the front side and the back side. The housing includes a main channel and a first reference channel. The differential transducer assembly includes a first differential sensing element having a first diaphragm characterized by first diaphragm side and a second diaphragm side. The differential transducer assembly includes a first header configured to house the first differential sensing element, route pressure from the main channel to the first diaphragm side, and route pressure from the first reference channel to the second diaphragm side. The first header includes a first set of header pins extending substantially perpendicular to the axis from an inner portion of the first header to an outer portion of the first header. The first set of header pins are configured for electrical communication with the first differential sensing element.

In certain implementations, the differential pressure transducer assembly may further include a second reference channel, a second differential sensing element that includes a second diaphragm, and a second header configured to house the second differential sensing element. The second header may further route pressure from the main channel to a first side of the second diaphragm and route pressure from the second reference channel to a second side of the second diaphragm. The second header may include a second set of header pins extending substantially perpendicular to the axis from an inner portion of the second header to an outer portion of the second header. The second set of header pins are configured for electrical communication with the second differential sensing element.

According to an example implementation of the disclosed technology, a method is provided for assembling the differential transducer assembly. The method includes providing a housing characterized by a front side and a back side in axial alignment along an axis extending through the front side and the back side. The housing includes a main channel and a first reference channel. The method includes assembling a first header sub-assembly by installing a first set of header pins in a first header, attaching a first differential sensing element to the first header, and electrically connecting the first set of header pins to the first differential sensing element. The method includes attaching the header subassembly to the housing such that the first set of header pins extend substantially perpendicular to the axis from an inner portion of the first header to an outer portion of the first header.

In certain exemplary implementations, the method may further include assembling a second header sub-assembly by installing a second set of header pins in a second header, attaching a second differential sensing element to the second header, electrically connecting the second set of header pins to the second differential sensing element, and attaching the second header subassembly to the housing such that the second set of header pins extend substantially perpendicular to the axis from an inner portion of the second header to an outer portion of the second header.

According to an example implementation of the disclosed technology, another method is provided for assembling the differential transducer assembly. The method includes providing a housing characterized by a front side and a back side in axial alignment along an axis extending through the front side and the back side, where the housing includes a main channel and at least one reference channel. The method can include assembling a header sub-assembly by one or more of: joining a straight first reference tube to at least a first header adapter cap, joining a straight main tube to at least one header manifold, attaching a first differential sensing element to a first header, installing a first set of header pins in a first header, electrically connecting the first set of header pins to the first differential sensing element, joining the at least one header manifold to a first side of the first header, joining a first header adaptor cap to a second side of the first header; and sliding ferrules onto the corresponding straight first reference tube and the straight main tube. In block 706, the method 700 can include attaching the header sub-assembly to the housing by tightening the ferrules such that the first set of header pins extend substantially perpendicular to the axis from an inner portion of the first header to an outer portion of the first header.

In certain exemplary implementations, the method may further include assembling a differential transducer assembly having a second differential sensing element by one or more of: joining a straight second reference tube to at least a second header adapter cap, attaching a second differential sensing element to a second header, installing a second set of header pins in a second header, electrically connecting the second set of header pins to the second differential sensing element, joining the at least one header manifold to a first side of the second header, joining a second header adaptor cap to a second side of the second header, and sliding a ferrule onto the straight second reference tube.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
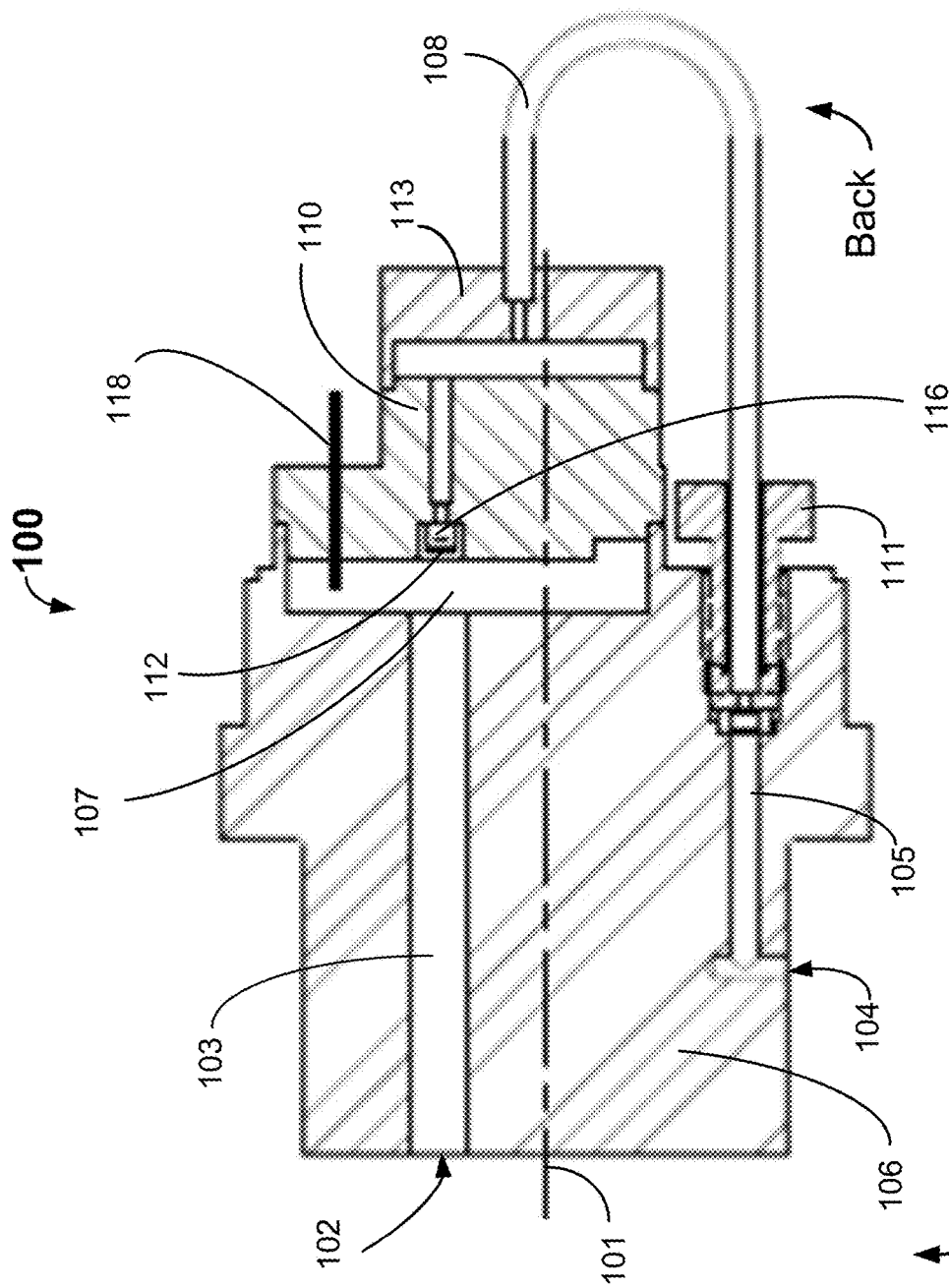
FIG. 1 depicts a conventional differential pressure transducer 100 having header pins 118 disposed substantially parallel to the transducer axis and extending through the header 110 to a back side of the header 110. A tube 108 is in communication with a reference inlet port 104 and is bent in a U-shape to route reference pressure to a back side of a sensing element 112.

Although many embodiments of the disclosed technology are explained in detail, it is to be understood that other embodiments are contemplated. Accordingly, it is not intended for the disclosed technology to be limited in scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

As discussed herein, the term "axis" is intended to refer to a reference line in a Cartesian-coordinate system that is co-located with an axis of the transducer assembly. Unless described otherwise herein, the axis of the transducer assembly is defined as the rotationally invariant axial dimension of the transducer assembly main pressure inlet port defined at least by a substantially cylindrical portion of the main inlet port and/or attachment nipple of the transducer assembly. For embodiments having main inlet ports that are characterized other than cylindrical, (rectangular or square, for example) the axis may be defined as being substantially perpendicular to a joining surface between the transducer assembly and an external equipment interface port to which the transducer assembly is configured for coupling.

Referring now to the figures, in which like numerals represent like elements, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may desirable and/or required for implementation. However, because such elements are well known in the art, and because they do not facilitate a better understanding of the disclosed technology, a discussion of such elements is not provided herein.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream. For example, in one illustrative implementation, the transducer assembly may be configured to measure the dynamic and/or static oil pressure within a machine. In certain example implementations, the transducer assembly may be utilized to measure a differential pressure between a first input condition stream entering a first inlet port and a second input condition stream entering a second inlet port. The terms "main" and "reference" used herein may refer respectively to the first and second input condition stream. However, in some implementations, such designations may be arbitrary.

FIG. 1 depicts a conventional (prior art) differential pressure transducer 100 with a main inlet port 102 in communication with a main channel 103, and a reference inlet port 104 in communication with a reference channel 105, each defined in a housing 106. The main channel 103 is in communication with a main pressure cavity 107, which can route main pressure to a front side of a sensing element 112. The reference channel 105 is in communication with a tube 108 via a ferrule 111, which is utilized to attach one end of the tube 108 to the housing 106. The tube 108 is bent in a U-shape, attached to a cap 113 on the back side of the header 110, and in communication with a reference pressure cavity 116, which is configured to route reference pressure to a back side of the sensing element. The main and reference pressures applied to opposite sides of a diaphragm (in mechanical communication with the sensing element 112) allow the sensing element 112 to measure the difference between the main and reference pressures. To supply power to the sensing element 112 and/or to communicate the resulting differential pressure signal from the sensing element 112 to external equipment, header pins 118 are disposed substantially parallel to the transducer axis 101 and extending through the header 110 from a front side to a back side of the header 110. As discussed above in the background section, this conventional transducer 100 arrangement can have several drawbacks that may be addressed by certain implementations and improvements of the disclosed technology, which will now be discussed with reference to FIGS. 2-5 below.

Figure 2:
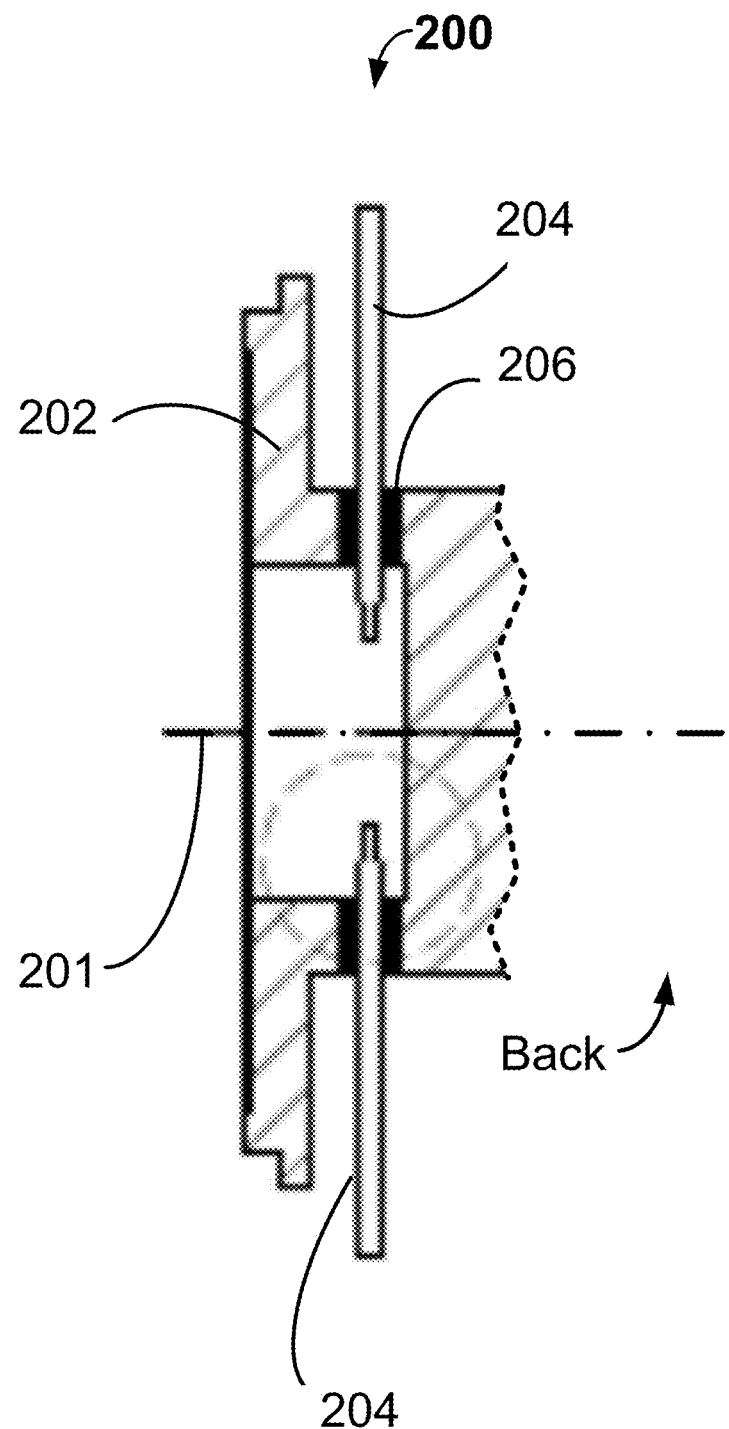
FIG. 2 illustrates an exemplary implementation of a portion of a header assembly 200 having header pins 204 that extend substantially perpendicular to the transduce assembly axis 201 and through sides of the header 202 (rather than through a back portion of the header as shown in FIG. 1), according to the disclosed technology.

FIG. 2 illustrates an exemplary implementation of a portion of a header assembly 200 having header pins 204 that are configured substantially perpendicular to the axis 201 and through sides of the header 202 (rather than through a back portion of a header 110 as shown in FIG. 1), according to the disclosed technology. The header pins 204 may be electrically conductive and may be electrically isolated from the header 202 by non-conductive seals 206 such as glass. While not shown, the header pins may be electrically connected to a sensing element, for example, to supply power to the sensing element and/or to communicate pressure signal(s) from the sensing element to external equipment. In accordance with certain exemplary embodiments, the perpendicular orientation of the header pins 204 with respect to the axis 201, as shown in FIG. 2 may provide for a more compact transducer package without requiring electrical connections to be routed out of the back side and may enable additional improvements that can simplify the assembly of the transducer.

Figure 3:
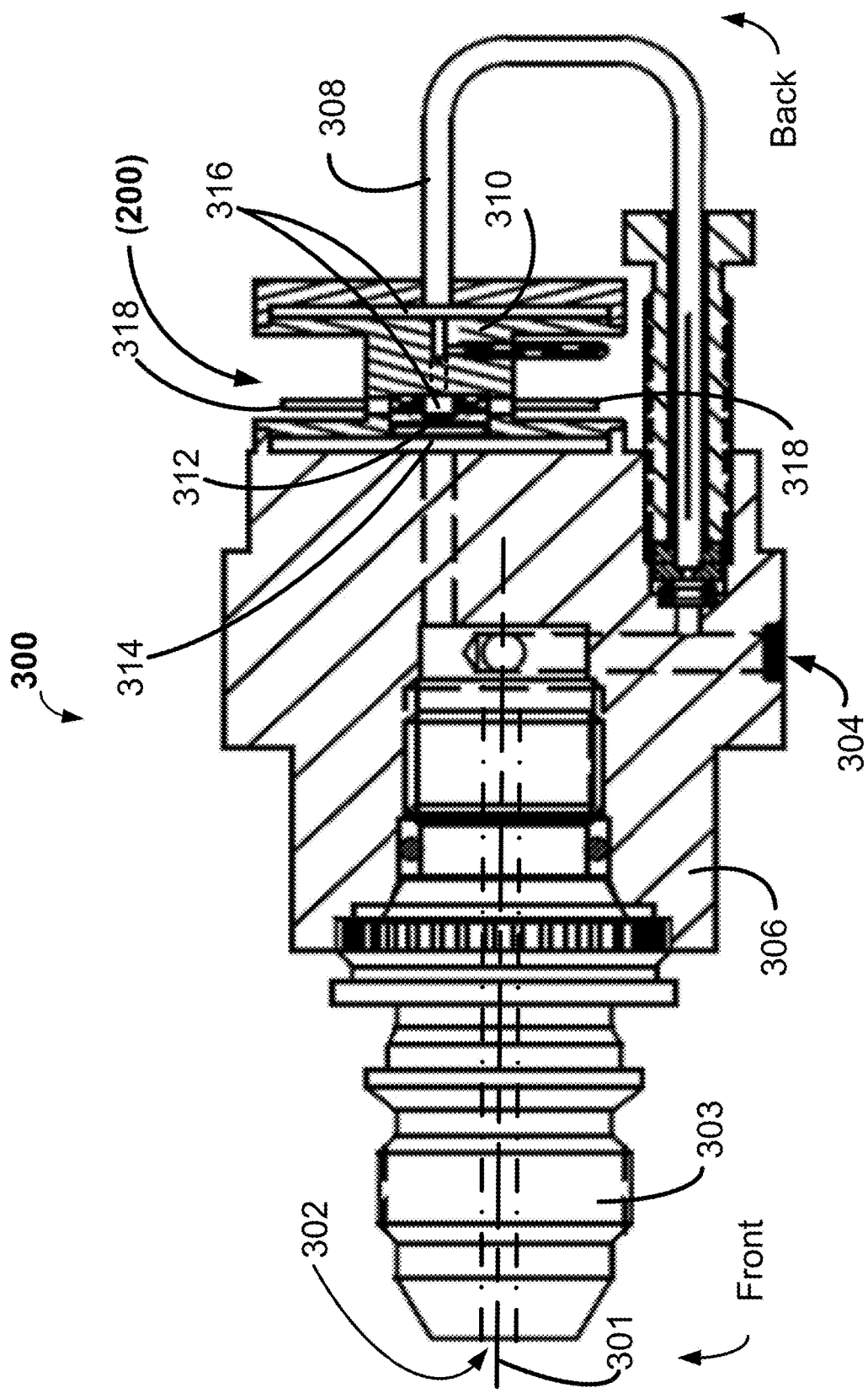
FIG. 3 is a cross-sectional side-view illustration of an example pressure transducer assembly 300 having header pins 318 that extend through a portion of the header and are substantially perpendicular to the transducer assembly axis 301, in accordance with a certain implementation of the disclosed technology.

FIG. 3 illustrates a pressure transducer assembly 300 in accordance with an example implementation of the disclosed technology. The assembly 300 includes a header 310 that can be the same or similar to the header 202 included in the header assembly 200 as discussed with reference to FIG. 2. The assembly 300 includes header pins 318 that extend through a portion of the header top and/or bottom sides and are configured substantially perpendicular to the transducer assembly axis 301. In this implementation, a main inlet port 302 may be defined in the attachment nipple 303, which may be configured to attach to an external machine or device for measuring pressure. The main inlet port 302 may be configured to route a main pressure to a front side of a sensing element 312. In certain implementations, a main pressure cavity 314 may be utilized in front of the sensing element 312, for example, to alter the frequency response of the transducer assembly 300.

In accordance with certain exemplary implementations of the disclosed technology, a reference inlet port 304 may be defined in the housing 306 of the assembly 300 and may be configured to route a reference pressure to a back side of the sensing element 312 via a tube 308 and other associated passageways. In some implementations, one or more reference pressure cavities 316 may be utilized behind the sensing element 312 and may be configured as passageways to route reference pressure present at the reference inlet port 304 to the sensing element 312. In some implementations the one or more reference pressure cavities 316 may be configured to alter the frequency response of the transducer assembly 300. As may be appreciated, the perpendicular orientation of the header pins 318 with respect to the axis 301 may provide for a more compact design without requiring electrical connections to be routed out of the back side of the assembly 300. The perpendicular orientation of the header pins 318 may enable increased reliability of the transducer assembly 300 and/or may provide a simplified manufacturing process. The perpendicular orientation of the header pins 318, for example, may enable improved options for the placement, bend, and/or external routing of the tube 308, which may provide advantages over the conventional transducer design (as discussed above with respect to FIG. 1). A transducer assembly configuration that provides such advantages will now be discussed below with reference to FIG. 4.

Figure 4:
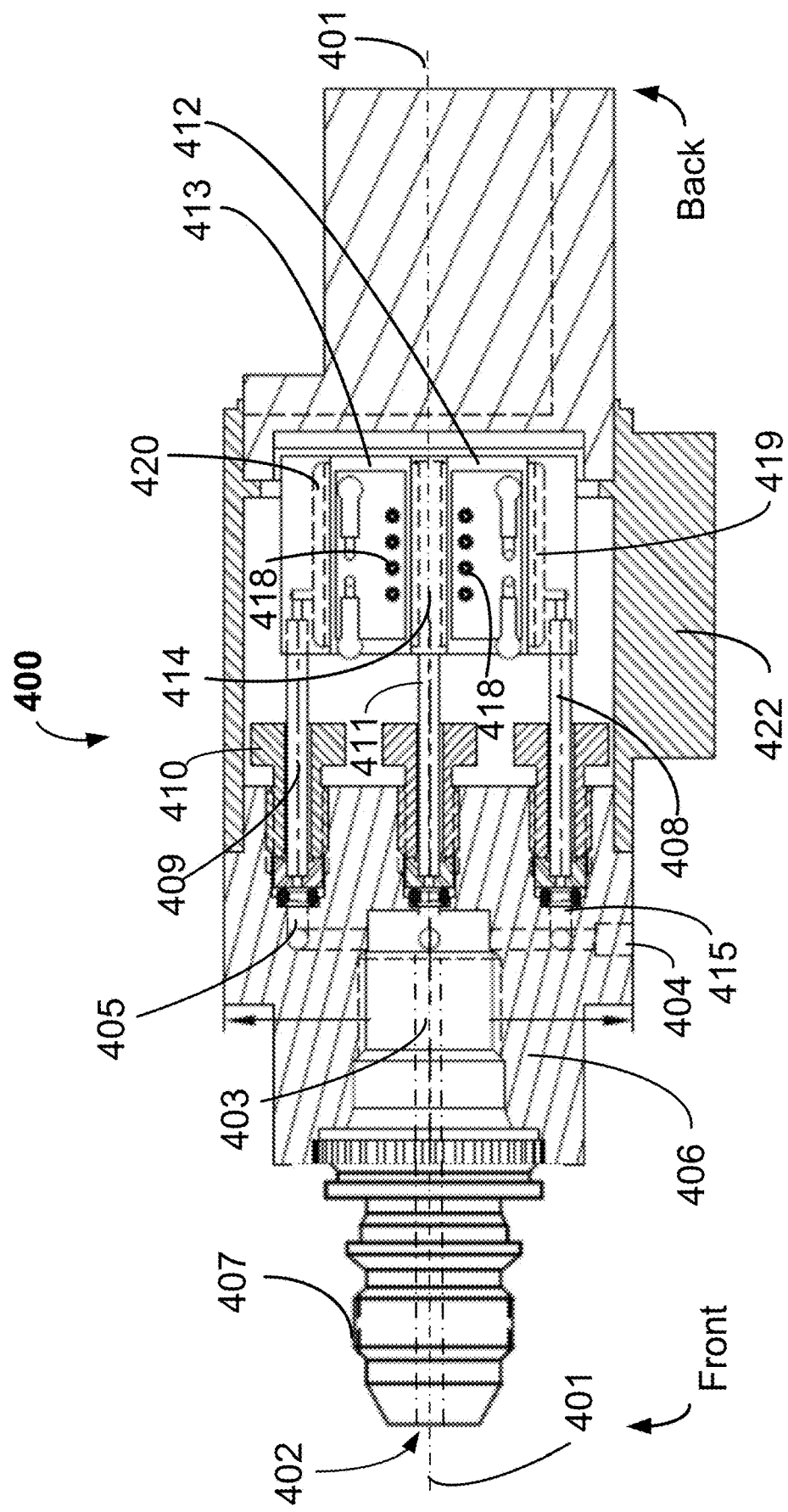
FIG. 4 is a cross-sectional side-view illustration of an example stacked header pressure transducer assembly 400 in which header pins 418 are configured to extend through a sidewall of their associated header 412, 413, and are configured in a perpendicular orientation with respect to the transducer assembly axis 401, in accordance with a certain implementation of the disclosed technology.

FIG. 4 is a cross-sectional side-view illustration of an example stacked header pressure transducer assembly 400 in which header pins 418 are configured to extend through a sidewall of an associated header 412, 413, and are configured in a perpendicular orientation with respect to the transducer assembly axis 401. In this example implementation, the headers 412, 413 are shown stacked in mirror-image fashion, with each header 412, 413 housing its own differential transducer (not shown). This example configuration enables the main pressure to be routed from a main inlet port 402 to a central portion between the stacked headers 412, 413 for communication with the central-facing sides of both differential transducers, as will be discussed further below. The arrangement of the header pins 418 in the perpendicular orientation (rather than the parallel orientation of the header pins 118 of the prior art as shown in FIG. 1) can provide a more compact assembly 400, for example, that allows for other housing and/or mounting components to be attached to the back side of the assembly 400. Furthermore, as illustrated and as will be discussed below, the header pins 418 arranged in a substantially perpendicular orientation with respect to the axis 401 may enable the use of straight tubing sections for routing pressures without requiring a reference pressure tube to be bent and/or routed to the back side of the assembly.

As illustrated in FIG. 4, the pressure transducer assembly 400 can include a main inlet port 402 joined with a main channel 403 defined in the housing 406 and/or attachment nipple 407. In certain example implementations, the main channel 403 may be joined via a main tube 411 with a manifold 414 defined between the (stacked) headers 412, 413, for example, to route a main pressure to a first side of respective sensing element diaphragms (not shown) in each of the headers 412, 413. In certain example implementations, each sensing element (not shown) may include a differential transducer (such as a Wheatstone bridge) in mechanical communication with a respective diaphragm, where a main pressure is directed to a first side of the diaphragm, and a reference pressure is directed to a second side of the diaphragm so that a differential pressure may be measured.

In certain example implementations, the pressure transducer assembly 400 can include one or more reference inlet ports, such as a first reference inlet port 404 joined with one or more of a first reference channel 415 and/or a second reference channel 405 defined in the housing 406. Certain implementations may include a bore and/or channel between the first reference port 404 and a first reference tube 408, which may route reference pressure to a second side of a first sensing element diaphragm (not shown) installed in the first header 412. Certain example implementations may also include a bore and/or channel between the first reference port 404 and a second reference tube 409, which may route reference pressure to a second side of a second sensing element diaphragm (not shown) installed in the second header 413. In this respect, the assembly 400 may provide redundant differential pressure measurements via the first and second sensing elements.

In certain implementations, the first reference inlet port 404 and associated bores/channels may be joined with the first reference tube 408 via a first reference channel 415, which may be configured to route a first reference pressure to a second side of a sensing element diaphragm (not shown) in the first header 412. Similarly, a second reference inlet port (not shown) and a second reference channel 405 with associated bores/channels may be joined to a second reference tube 409, which may be configured to route a second reference pressure to a second side of a sensing element diaphragm (not shown) in the second header 413.

In certain exemplary implementations, the first reference inlet port 404 may be configured to route only a first reference pressure to the first header 412 via the first reference channel 415 and the first reference tube 408, and a second reference inlet port (not shown) may be configured to route only a second reference pressure to the second header 413 via the second reference channel and the second reference tube 409. In this example implementation, two different reference pressures may be utilized for measuring respective differential pressures with respect to the main pressure.

In certain implementations, threaded ferrules 410 may be utilized to connect the tubes 408, 409, 411 to the respective bores/channels in the housing 406, for example, by applying an appropriate torque. In other implementations (not shown), one or more of the tubes 408, 409, 411 may be connected to the housing 406 (for example, by brazing, welding, etc.) to provide passages from the respective inlet port(s) to the associated sensing elements in the headers 412, 413 without requiring the ferrules 410.

As may be evident or appreciated, the configuration of the pressure transducer assembly 400 shown and discussed with reference to FIG. 4 may provide certain advantages over previous configurations. The header pins 418 extending perpendicularly to the assembly axis 401 may enable electrical connections to the sensing elements (not shown) in the headers 412, 413 to be routed out the side of the housing via the header pins 418, rather than out the back side, which may allow for additional structures, etc., to be attached to the back side of the headers 412, 413 and/or a sleeve 422 that may be attached to the housing 406.

In accordance with an example implementation, and as depicted in FIG. 4, first header adapter cap 419 may be attached to the first reference tube 408 to allow pressure in the first reference tube 408 to be routed to the first header 412 and the associated pressure sensing element (not shown). The first header adapter cap 419 may be mounted to the first header 412 and may occupy part or all of the bottom side of the first header 412. Similarly, a second header adapter cap 420 may be attached to the second reference tube 409. The second header adapter cap 420 may be mounted to the second header 413 and may occupy part or all of the top side of the second header 413. This configuration may simplify the assembly and/or welding process. In accordance with certain exemplary implementations of the disclosed technology, one or more of the reference tubes 408, 409 may be (internally) routed using straight sections of tubing running from the associated channels to respective ports/channels in the headers 412, 413, which may provide manufacturing advantages and avoid issues with bending the tubes, as discussed with reference to FIG. 1.

In accordance with certain exemplary implementations, the configuration (such as the stacked headers 412, 413) shown and discussed above with respect to FIG. 4, may provide an additional benefit of providing a common central manifold 414 that enables the main pressure (condition stream) entering the main inlet port 402 to interact with a first side of each of two diaphragms associated with sensing elements installed respectfully in each of the headers 412, 413. Certain configurations may enable redundant differential pressures to be measured with the same transducer assembly 400. Other configurations may enable two separate differential pressures to be measured with the same transducer assembly 400.

Figure 5:
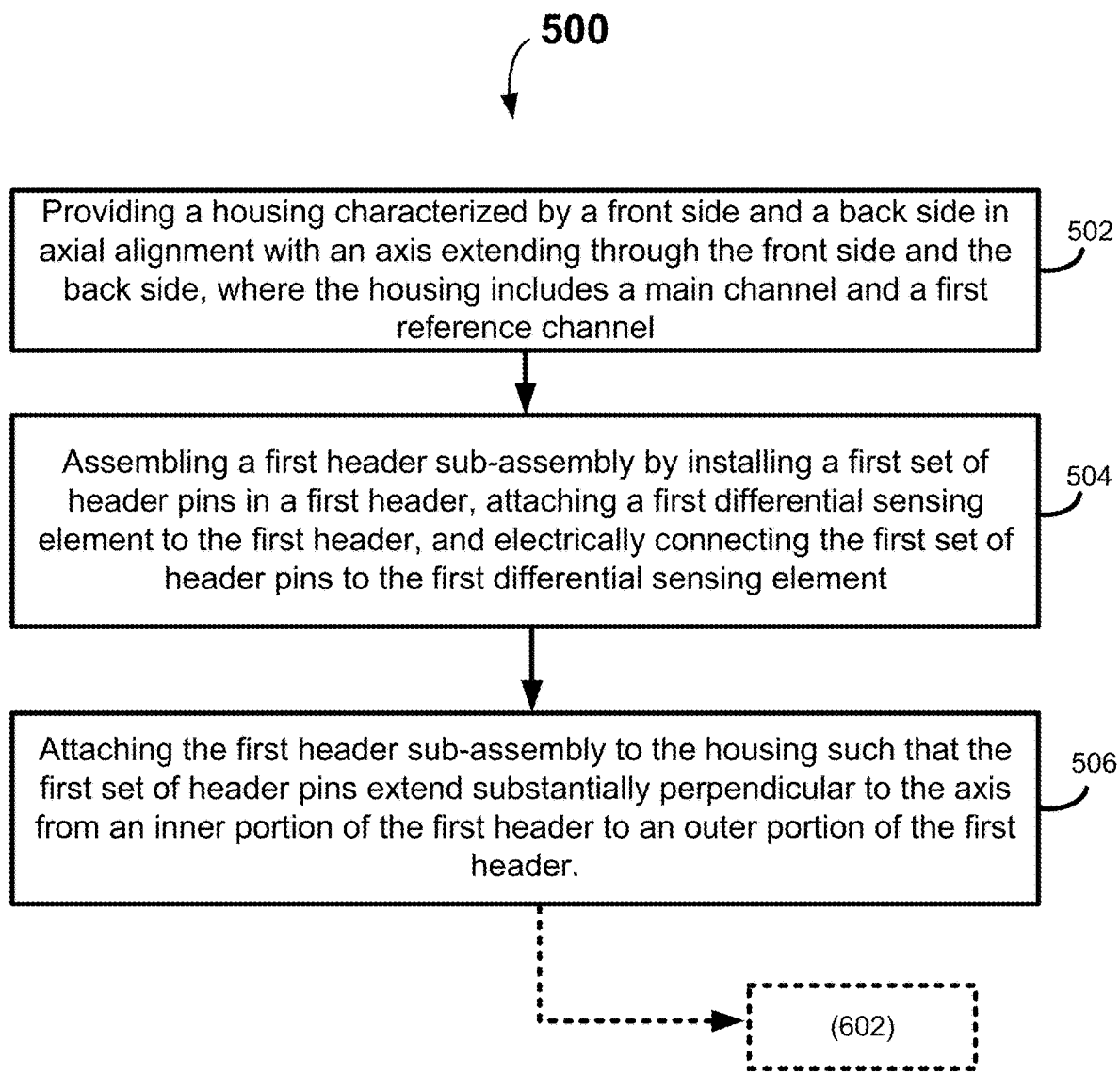
FIG. 5 is a flow diagram of a method 500, according to an example implementation of the disclosed technology.

FIG. 5 is a flow diagram of a method 500, according to an example implementation of the disclosed technology. In block 502, the method 500 includes providing a housing characterized by a front side and a back side in axial alignment along an axis extending through the front side and the back side, where the housing includes, a main channel, and a first reference channel. In block 504, the method 500 includes assembling a first header sub-assembly by installing a first set of header pins in a first header, attaching a first differential sensing element to the first header, and electrically connecting the first set of header pins to the first differential sensing element. In block 506, the method 500 includes attaching the header sub-assembly to the housing such that the first set of header pins extend substantially perpendicular to the axis from an inner portion of the first header to an outer portion of the first header.

In accordance with certain exemplary implementations of the disclosed technology, the main channel is configured to route a main pressure to a first diaphragm side of the first differential sensing element, and the first reference channel is configured to route a reference pressure to a second diaphragm side of the first differential sensing element.

Figure 6:
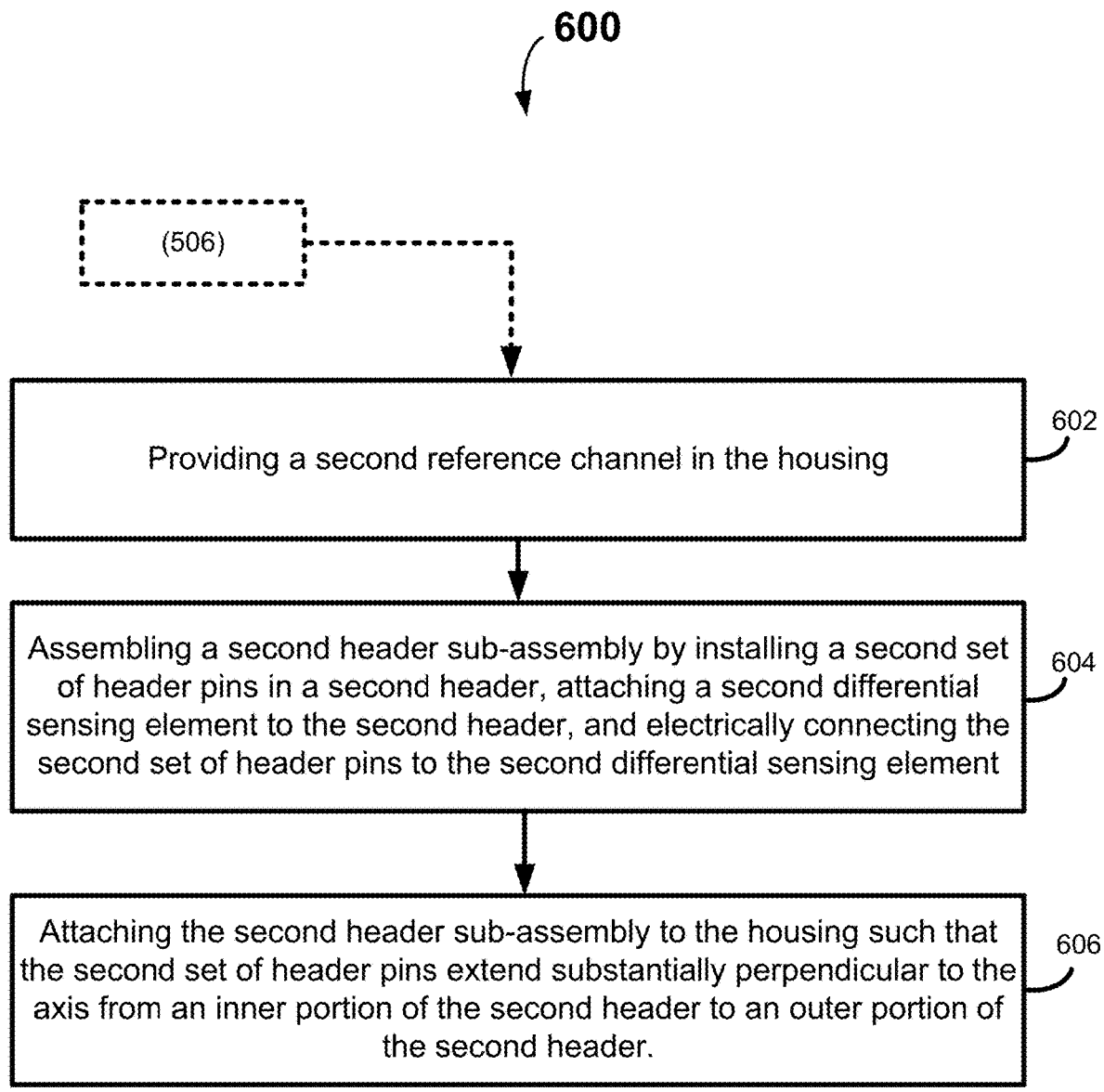
FIG. 6 is a flow diagram of a method 600 that may be used in addition to the method 500 of FIG. 5, according to an example implementation of the disclosed technology.

FIG. 6 is a flow diagram of a method 600 that may be used in addition to the method 500 of FIG. 5, for example, to assemble a differential transducer assembly having a second differential sensing element, such as depicted in FIG. 4. In block 602, the method 600 can include providing a second reference channel in the housing. In block 604, the method 600 can include assembling a second header sub-assembly by installing a second set of header pins in a second header, attaching a second differential sensing element to the second header, and electrically connecting the second set of header pins to the second differential sensing element. In block 606, the method 600 can include attaching the second header sub-assembly to the housing such that the second set of header pins extend substantially perpendicular to the axis from an inner portion of the second header to an outer portion of the second header.

Figure 7:
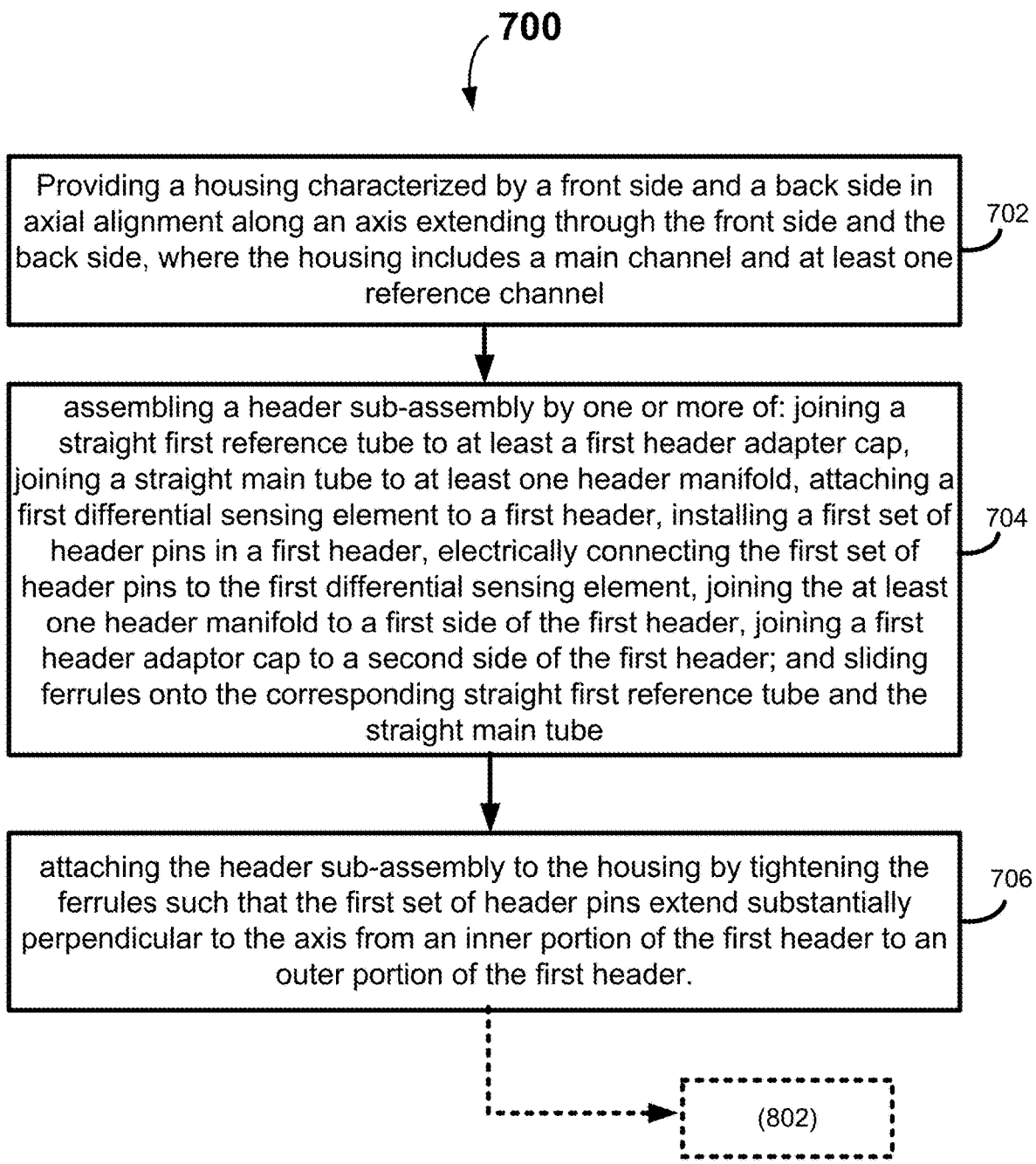
FIG. 7 is a flow diagram of a method 700, according to an example implementation of the disclosed technology.

FIG. 7 is a flow diagram of a method 700 for assembling the assembly 400 as depicted in FIG. 4. In block 702, the method 700 can include providing a housing characterized by a front side and a back side in axial alignment along an axis extending through the front side and the back side, where the housing includes a main channel and at least one reference channel. In block 704, the method 700 can include assembling a header sub-assembly by one or more of: joining a straight first reference tube to at least a first header adapter cap, joining a straight main tube to at least one header manifold, attaching a first differential sensing element to a first header, installing a first set of header pins in a first header, electrically connecting the first set of header pins to the first differential sensing element, joining the at least one header manifold to a first side of the first header, joining a first header adaptor cap to a second side of the first header; and sliding ferrules onto the corresponding straight first reference tube and the straight main tube. In block 706, the method 700 can include attaching the header sub-assembly to the housing by tightening the ferrules such that the first set of header pins extend substantially perpendicular to the axis from an inner portion of the first header to an outer portion of the first header.

Figure 8:
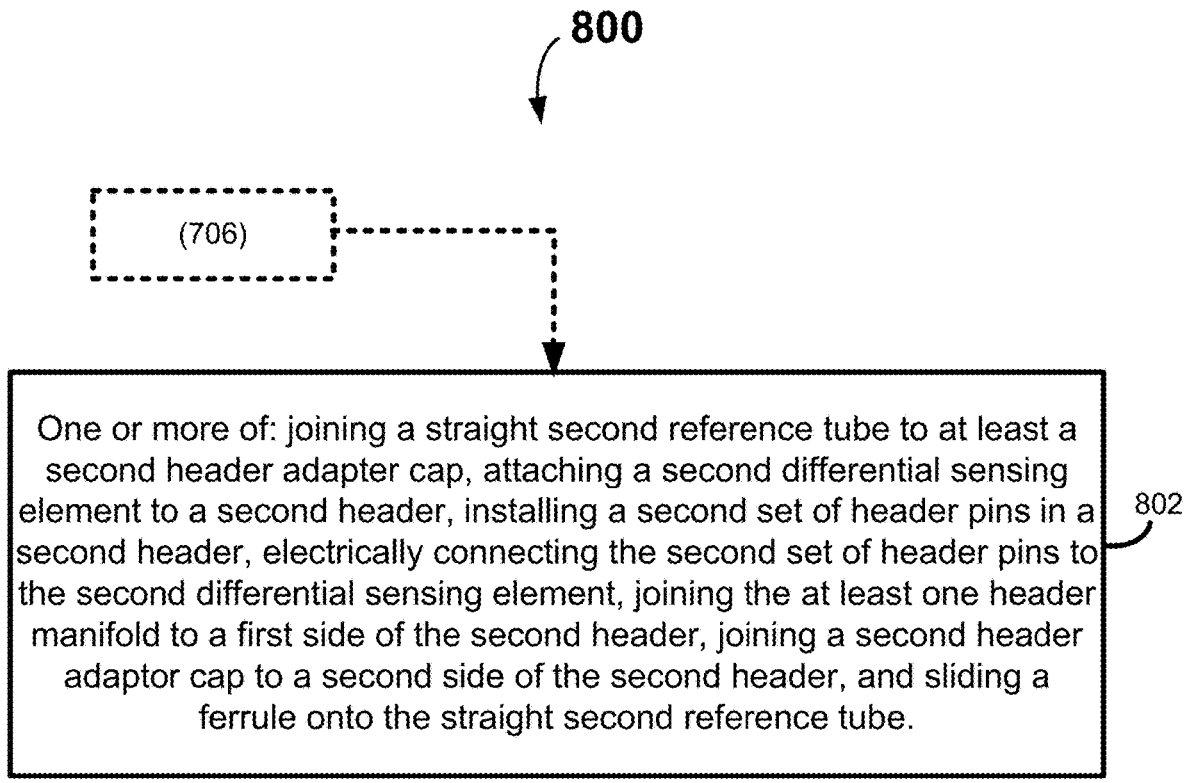
FIG. 8 is a flow diagram of a method 800 that may be used in addition to the method 700 of FIG. 7, according to an example implementation of the disclosed technology.

FIG. 8 is a flow diagram of a method 800 that may be used in addition to the method 700 of FIG. 7, for example, to assemble a differential transducer assembly having a second differential sensing element, such as depicted in FIG. 4. In block 802, the method 800 includes one or more of: joining a straight second reference tube to at least a second header adapter cap, attaching a second differential sensing element to a second header, installing a second set of header pins in a second header, electrically connecting the second set of header pins to the second differential sensing element, joining the at least one header manifold to a first side of the second header, joining a second header adaptor cap to a second side of the second header, and sliding a ferrule onto the straight second reference tube.

Certain implementation can further include oil filling at least a portion of one or more of the first header and the second header.

In certain exemplary implementations, the joining can be done by brazing or welding the associated components. In certain exemplary implementations, the joining can comprise forming a seal around at least a periphery between the associated components while an inner (continuous) channel is maintained to communicate pressure therein.

Certain implementations may further include coupling a sleeve to the housing.

In accordance with certain exemplary implementations of the disclosed technology, the main channel may be configured to route a main pressure to a first diaphragm side of the second differential sensing element and the second reference channel may be configured to route a reference pressure to a second diaphragm side of the second differential sensing element.

In certain exemplary implementations, the second reference channel may be joined with the first reference channel.

According to an exemplary implementation of the disclosed technology, the first reference port may be configured to route a first reference pressure to the first reference channel. In certain exemplary implementations, a second reference port may be configured to route a second reference pressure to the second reference channel.

Certain exemplary implementation may include joining the first header and the second header with a manifold. The manifold may be configured to communicate pressure from the main channel to the first differential sensing element and the second differential sensing element.

According to an exemplary implementation of the disclosed technology, the method may include installing a first reference tube between the first reference channel to the first header sub-assembly.

Certain implementations may include installing an attachment nipple to the housing. The attachment nipple can include a main port configured for routing main pressure to the main channel.

Those skilled in the art will appreciate that the system of equations describing the flow of pressure P through a pipe may be reduced to a wave equation in one dimension:

$$\frac{1}{c^2}\left(\frac{\partial^2 P'}{\partial t^2} + K\frac{32\mu}{\rho D^2}\frac{\partial P'}{\partial t}\right) = \frac{\partial^2 P'}{\partial x^2},$$

where c is the velocity of sound in the unconfined fluid (measurement media) and K is the fluid bulk modulus. The damping coefficient, $$K\frac{32\mu}{\rho D^2},$$

is dependent on both the pipe diameter D and viscosity (μ) of the media. With appropriate boundary conditions, the wave equation may be solved using Laplace transforms such that the frequency response of the pipe structure may be analytically estimated.

As the equation above illustrates, when the pressure flow is in an inlet tube having a large aspect ratio (for example, a smaller diameter D and long length L) the damping is increased. As the flow reaches the cavity (for example, the main pressure cavity 314 or reference pressure cavity 316 in FIG. 3 or the manifold 414 of FIG. 4) of a set volume, the flow is further damped as the media expands to fill the cavity. By manipulating the diameter D and length L of the inlet tube and the volume of the cavity, the damping ratio, and cut-off frequency can be well tuned for the respective application. In this way, undesired ripple frequency can be substantially reduced or eliminated, while still retaining lower frequency components that are desirable to measure.

Using standard system dynamic analysis, an equation may be derived for the resonant frequency of the transducer assembly. The formula for the resonant frequency F may be expressed as:

$$F = \frac{\sqrt{(3\pi r^2 c^2/4LV)}}{2\pi},$$

where r is the internal radius of inlet tube, c is the velocity of sound in the input stream pressure media, L is the length of the inlet tube, and V is the volume of the cavity. When an inlet tube and cavity structure is tuned to match the pressure ripple frequency, the ripple pressure can be amplified and can exceed the pressure rating of the transducer, the housing, and/or other parts of the assembly. For example, exceeding the rated pressure can apply excessive stresses on the transducer die and cause the transducer to fail.

Referring again to FIG. 4, and as may be appreciated by inspection of the resonant frequency equation above, the increase in the resonant frequency is roughly proportional to a corresponding increase in the radius r for inlet tubes having a larger diameter D. However, as the inlet tube diameter D is decreased below about 1 mm (0.039") in diameter, capillary action can begin to take effect, reducing the corresponding change in resonant frequency, and resulting in diminishing returns of the reduction in the resonant frequency, and in some applications, making the inlet tube susceptible to clogging with the decreasing tube diameter D.

As may also be appreciated by inspection of the equation above, the resonant frequency F is also inversely proportional to the square root of the length L of the inlet tube and the volume V of the cavity. Therefore, the pressure ripple can be suppressed by increasing the inlet tube length L and/or increasing the volume V of the cavity.

In accordance with certain exemplary implementations of the disclosed technology, and as discussed above, the channels 403, 404, 405 may be configured to have diameters ranging from about 0.010" to about 0.100". In some implementations, the diameter of the inlet channels may range from 0.01" to 0.02". In some implementations, the diameter of the inlet channels may range from 0.02" to 0.04". In some implementations, the diameter of the inlet channels may range from 0.04" to 0.06". In some implementations, the diameter of the inlet channels may range from 0.06" to 0.08". In some implementations, the diameter of the inlet channels may range from 0.08" to 0.10".

In accordance with certain exemplary implementations of the disclosed technology, the housing 406 and/or headers 412, 413 may be configured with certain dimensions that can be controlled (during the initial manufacturing process and/or in a separate machining step) to result in a suitable volume of the manifold 414 and or associated cavities for a given application and/or damping specification. One skilled in the art will appreciate that the inlet port 402 and/or attachment nipple 407 can be customized to fit many configurations, for example, but not limited to, O-ring seals and threads.

One skilled in the art will appreciate that narrowing the inlet ports and/or channels (i.e., decreasing the diameter) enhances attenuation. However, if it is too narrow for the applied pressure media, desirable low-frequency components (e.g., static and quasi-static pressures) may also be eliminated, which may interfere with the accuracy of the sensing element. Conversely, if the inlet ports and/or channels are too wide, high-frequency ripples may not be sufficiently eliminated, which can also interfere with the accuracy of the sensing element and can decrease its operable lifespan. It is clear that the similarity in the piping between the main port and the reference ports allows for better frequency matching between the ports. This can be important when both ports may experience similar rise times and it may be important to measure the response of both compared to each other.

As used in the specification and the appended claims, the singular forms "a," "an," and "the" include plural referents unless the context clearly dictates otherwise. Also, in describing the preferred embodiments, certain terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an implementation includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

We claim:

1. A differential pressure transducer assembly, comprising:
    a housing characterized by a front side and a back side in axial alignment along an axis extending through the front side and the back side, the housing comprising:
        a main channel; and
        a first reference channel;
    a first differential sensing element comprising a first diaphragm characterized by first diaphragm side and a second diaphragm side; and
    a first header configured to house the first differential sensing element, route pressure from the main channel to the first diaphragm side, and route pressure from the first reference channel to the second diaphragm side, the first header comprising:
        a first set of header pins extending substantially perpendicular to the axis from an inner portion of the first header to an outer portion of the first header, the first set of header pins configured for electrical communication with the first differential sensing element.

2. The differential pressure transducer assembly of claim 1, further comprising:
    a second reference channel;
    a second differential sensing element comprising a second diaphragm; and
    a second header configured to house the second differential sensing element and route pressure from the main channel to a first side of the second diaphragm, and route pressure from the second reference channel to a second side of the second diaphragm, the second header comprising:
        a second set of header pins extending substantially perpendicular to the axis from an inner portion of the second header to an outer portion of the second header, the second set of header pins configured for electrical communication with the second differential sensing element.

3. The differential pressure transducer assembly of claim 2, wherein the second reference channel is joined with the first reference channel.

4. The differential pressure transducer assembly of claim 2, comprising a first reference port in communication with the first reference channel and a second reference port in communication with the second reference channel.

5. The differential pressure transducer assembly of claim 2, further comprising a manifold joining the first header and the second header, the manifold configured to route pressure from the main channel to the first diaphragm and the second diaphragm.

6. The differential pressure transducer assembly of claim 1, further comprising a first reference tube configured to route pressure from the first reference channel to the second diaphragm side.

7. The differential pressure transducer assembly of claim 6, wherein the first reference tube is bent.

8. The differential pressure transducer assembly of claim 6, wherein the first reference tube is substantially straight.

9. A method, comprising:
providing a housing, the housing characterized by a front side and a back side in axial alignment along an axis extending through the front side and the back side, the housing comprising:
a main channel; and
a first reference channel;
assembling a first header sub-assembly, comprising:
installing a first set of header pins in a first header;
attaching a first differential sensing element to the first header; and
electrically connecting the first set of header pins to the first differential sensing element; and
attaching the first header sub-assembly to the housing such that the first set of header pins extend substantially perpendicular to the axis from an inner portion of the first header to an outer portion of the first header.

10. The method of claim 9, wherein the main channel is configured to route a main pressure to a first diaphragm side of the first differential sensing element, and the first reference channel is configured to route a reference pressure to a second diaphragm side of the first differential sensing element.

11. The method of claim 9, further comprising:
providing a second reference channel in the housing;
assembling a second header sub-assembly, comprising:
installing a second set of header pins in a second header;
attaching a second differential sensing element to the second header; and
electrically connecting the second set of header pins to the second differential sensing element; and
attaching the second header sub-assembly to the housing such that the second set of header pins extend substantially perpendicular to the axis from an inner portion of the second header to an outer portion of the second header.

12. The method of claim 11, wherein the main channel is configured to route a main pressure to a first diaphragm side of the second differential sensing element and the second reference channel is configured to route a reference pressure to a second diaphragm side of the second differential sensing element.

13. The method of claim 12, wherein the second reference channel is joined with the first reference channel.

14. The method of claim 12, wherein a first reference port is configured to route a first pressure to the first reference channel and a second reference port is configured to route a second pressure to the second reference channel.

15. The method of claim 12, further comprising joining the first header and the second header with a manifold, the manifold configured to route pressure from the main channel to the first differential sensing element and the second differential sensing element.

16. The method of claim 9, further comprising installing a first reference tube between the first reference channel to the first header sub-assembly.

17. A method, comprising:
providing a housing, the housing characterized by a front side and a back side in axial alignment along an axis extending through the front side and the back side, the housing comprising a main channel and at least one reference channel;
assembling a header sub-assembly, comprising:
joining a straight first reference tube to at least a first header adapter cap;
joining a straight main tube to at least one header manifold;
attaching a first differential sensing element to a first header;
installing a first set of header pins in a first header;
electrically connecting the first set of header pins to the first differential sensing element;
joining the at least one header manifold to a first side of the first header;
joining a first header adaptor cap to a second side of the first header; and
sliding ferrules onto the corresponding straight first reference tube and the straight main tube; and
attaching the header sub-assembly to the housing by tightening the ferrules such that the first set of header pins extend substantially perpendicular to the axis from an inner portion of the first header to an outer portion of the first header.

18. The method of claim 17, wherein joining comprises brazing or welding.

19. The method of claim 17, wherein assembling the header sub-assembly further comprises:
joining a straight second reference tube to at least a second header adapter cap;
attaching a second differential sensing element to a second header;
installing a second set of header pins in a second header;
electrically connecting the second set of header pins to the second differential sensing element;
joining the at least one header manifold to a first side of the second header;
joining a second header adaptor cap to a second side of the second header; and
sliding a ferrule onto the straight second reference tube.

20. The method of claim 19, further comprising oil filling at least a portion of one or more of the first header and the second header.

* * * * *